US008689963B2

(12) United States Patent
Georgens

(10) Patent No.: US 8,689,963 B2
(45) Date of Patent: Apr. 8, 2014

(54) CUSTOMER-OPERATED ORDERING KIOSK HAVING MODULAR HARDWARE CONFIGURATION INCLUDING OVERLAY AND INLAY PLATES

(71) Applicant: EMN8, Inc., San Diego, CA (US)

(72) Inventor: David Georgens, Cardiff by the Sea, CA (US)

(73) Assignee: EMN8, Inc., San Diego, CA (US)

( * ) Notice: Subject to any disclaimer, the term of this patent is extended or adjusted under 35 U.S.C. 154(b) by 0 days.

(21) Appl. No.: 13/632,873

(22) Filed: Oct. 1, 2012

(65) Prior Publication Data

US 2013/0092505 A1     Apr. 18, 2013

Related U.S. Application Data

(63) Continuation of application No. 12/552,990, filed on Sep. 2, 2009, now Pat. No. 8,276,735.

(60) Provisional application No. 61/094,862, filed on Sep. 5, 2008.

(51) Int. Cl.
*G07F 9/10* (2006.01)

(52) U.S. Cl.
USPC ........................................................ 194/350

(58) Field of Classification Search
USPC ........ 194/350; 312/326; 221/286; 40/611.01, 40/611.02
See application file for complete search history.

(56) References Cited

U.S. PATENT DOCUMENTS

| | | | |
|---|---|---|---|
| 4,454,670 A | 6/1984 | Bachmann et al. | |
| 4,973,109 A | 11/1990 | Diedrich | |
| 5,183,142 A | 2/1993 | Latchinian et al. | |
| 5,555,965 A * | 9/1996 | Mishina | 194/217 |
| 6,496,101 B1 | 12/2002 | Stillwagon | |
| 2005/0120540 A1 | 6/2005 | Sakanoue et al. | |
| 2006/0201776 A1* | 9/2006 | Myers et al. | 194/350 |

FOREIGN PATENT DOCUMENTS

DE          103.18.672 A1 * 11/2004 ............. G06K 13/08

OTHER PUBLICATIONS

Non-final Office Action dated Dec. 22, 2010 in regards to U.S. Appl. No. 12/552,990, filed Sep. 2, 2009.
Final Office Action dated Jun. 10, 2011 in regards to U.S. Appl. No. 12/552,990, filed Sep. 2, 2009.

* cited by examiner

*Primary Examiner* — Mark Beauchaine
(74) *Attorney, Agent, or Firm* — Knobbe Martens Olson & Bear LLP

(57) ABSTRACT

A system and method for integrating devices and equipment into self-service kiosk devices is disclosed. Hardware configuration kits are provided which allow for a less complicated implementation of specific and customized functionality for quick service restaurant (QSR) environments. In certain embodiments a kiosk door is coupled to the kiosk body to form a kiosk cabinet in which devices and equipment used to operate the kiosk are housed. Certain interior kiosk components and devices, such as coin dispensers, bill acceptors, and the like, may be configured to extend or protrude through the kiosk door so that they may be accessed by the customer. The kiosk door may have a hollowed out center or aperture which allows access to the interior cabinet. The aperture may be substantially covered by a removable door inlay which cooperatively includes cutouts corresponding to the components protruding through the door. A removable door overlay may also be provided which attaches to an outer surface of the kiosk door and may also include cutouts which correspond to the protruding components.

15 Claims, 8 Drawing Sheets

CUSTOMER-OPERATED ORDERING KIOSK HAVING MODULAR HARDWARE CONFIGURATION INCLUDING OVERLAY AND INLAY PLATES

RELATED APPLICATIONS

This application is a continuation of U.S. patent application Ser. No. 12/552,990, filed on Sep. 2, 2009, which claims the benefit of U.S. Provisional Patent Application No. 61/094,862, filed on Sep. 5, 2008, the entire disclosure of each of these prior patent applications is hereby incorporated by reference in its entirety.

BACKGROUND OF THE INVENTION

1. Field of the Invention

This application relates to customer-operated ordering kiosks. In particular, this application relates to an ordering kiosk configured with modular hardware components that allow for customer-operated ordering kiosks to be easily deployed across varying quick service restaurant environments.

2. Description of the Related Art

Existing kiosk designs typically include a specific set of hardware devices which are incorporated into its integral structure. When internal devices change, or new devices are required, it can become a lengthy and expensive process to redesign the kiosk to accommodate the new equipment.

SUMMARY OF CERTAIN INVENTIVE ASPECTS

The system, method, and devices of the present invention each have several aspects, no single one of which is solely responsible for its desirable attributes. Without limiting the scope of this invention, several of its features will now be discussed briefly.

In a first aspect, an ordering kiosk device comprises a cabinet housing; a kiosk door operatively coupled to the cabinet housing to provide access to an interior area of the housing, the kiosk door having an aperture covering a substantial portion of its face; a plurality of configuration kits installed within the cabinet housing, each configuration kit comprising one or more assembled components configured to provide functionality related to kiosk functional elements; a door overlay positioned on an outer surface of the kiosk door, the outer door overlay positioned to cover at least a portion of the aperture so as to block access to the interior area of the cabinet housing, the outer door overlay comprising an overlay cutout area corresponding to at least one of the assembled components of the configuration kits; and a door inlay positioned on an inner surface of the kiosk door, the door inlay comprising an inlay cutout area corresponding to at least a part of the overlay cutout area, the door inlay further comprising a mount suitable for supporting at least one of the assembled components.

In another aspect, a method of configuring an ordering kiosk is provided. The ordering kiosk includes a cabinet housing and a door coupled to the cabinet housing. The door has an aperture extending across a substantial portion of the door. The method includes attaching a first door inlay to an interior surface of the kiosk door, the door inlay having a first cutout corresponding to a first kiosk component protruding from the cabinet housing and through the aperture of the door. The method further includes attaching a first door overlay to an outer surface of the door, the door overlay having a second cutout large enough to receive the first kiosk component protruding through the first cutout.

BRIEF DESCRIPTION OF THE DRAWINGS

In this description, reference is made to the drawings wherein like parts are designated with like numerals throughout.

DETAILED DESCRIPTION OF CERTAIN INVENTIVE EMBODIMENTS

Various embodiments set forth herein describe systems and methods for integrating devices and equipment into self-service kiosk devices utilizing hardware configuration kits in cooperation with a specific kiosk door system which allows for a less complicated implementation of specific and customized functionality in varying quick service restaurant (QSR) environments. In certain embodiments, a kiosk door is coupled to the body of a kiosk to form a kiosk cabinet in which devices and equipment are stored and used to provide functionality to the kiosk. Certain interior kiosk components and devices, such as coin dispensers, bill acceptors, and the like, may be configured to extend or protrude through the kiosk door so that they may be accessed by the customer. The kiosk door may have a hollowed out center or aperture which allows access to the interior cabinet. The aperture may be substantially covered by a removable door inlay (and optionally, a removable door overlay) which cooperatively includes cutouts corresponding to the components protruding through the door. If the configuration or location of the protruding components changes, the door need not be redesigned in order to accommodate the change; instead the door inlay may be replaced by a new door inlay having cutouts corresponding to the new interior configuration.

Figure 1:
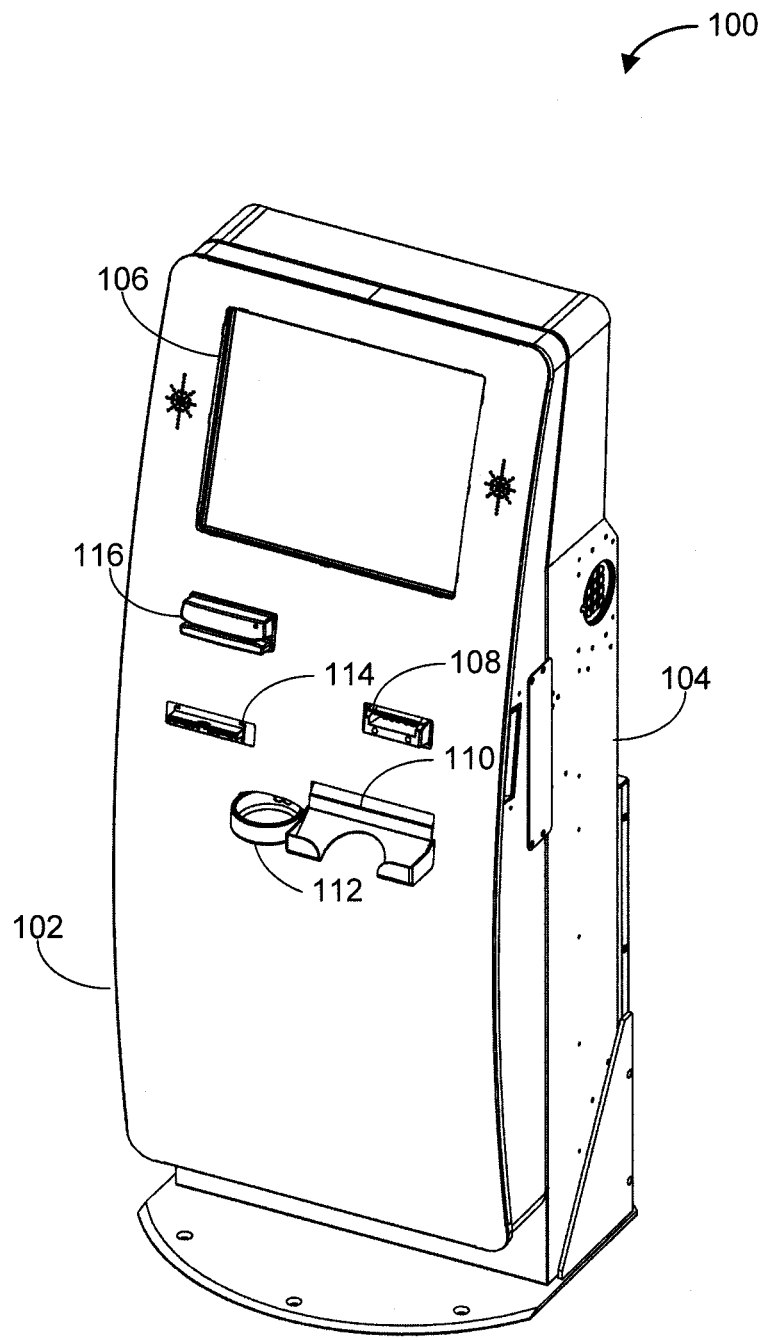
FIG. 1 is a front-right perspective view of the exterior of a kiosk device suitable for the implementation of various embodiments described herein.

FIG. 1 is a front perspective view of the exterior of a kiosk device 100 suitable for the implementation of various embodiments described herein. As shown, the kiosk device 100 may include a kiosk door 102 and a kiosk body 104 which integrally form an interior cabinet portion (not shown) which houses devices and equipment that are used to operate the kiosk device 100. The components and devices may be substantially located within the interior of the kiosk cabinet that is formed by the door 102 and body 104 of the kiosk 100. These components may include a display 106. The display 106 may be an LCD touch screen display, or it may take some other form. The display 106 is typically connected to a computing device (not shown) which is housed in the kiosk cabinet. The display may generally provide a visual interface which allows a customer to interact with the kiosk device. In the example shown in FIG. 1, the display 106 is viewable through a cutout portion of the kiosk door 102, the specific configuration of which is discussed below.

The kiosk 100 may also include a bill acceptor device bezel 108. The bill acceptor device bezel 108 typically is used to receive cash payments from customers. The exterior of the kiosk device 100 also may include a bill dispenser tray 110 and a coin cup 112. The bill dispenser tray 110 and the coin cup 112 typically are used to deliver change to customers after the customer has input cash via the bill acceptor device bezel 108. The bill dispenser device delivers paper currency to the customer, while the coin cup 112 delivers coins to the customer. The kiosk device 100 may also include a receipt printing bezel 114. The receipt printing bezel 114 is used to permit delivery of printed paper receipts to customers as evidence of their transaction. The kiosk device 100 may further include a magnetic card reading bezel 116. The magnetic card reader bezel 116 may be used to receive a credit card for acceptance of credit card payments from customers.

Each of the kiosk components described in connection with FIG. 1 is associated with an electro-mechanical device where a portion (such as the bezel, for example) may substantially extend from the cabinet of the device 100 through the door 102 in order to be accessible to customers who do not have access to the interior portion of the device (which is typically secured against unauthorized access). All of the associated devices are well-known known and will not be further discussed. These component devices may also include substantial portions which are positioned within the interior of the kiosk cabinet. In some embodiments, the devices may form a part of a distinct set of assembled components which are configured to carry out a functional element for the kiosk device 100. The distinct set of assembled components provides a modular approach to implementation of the functionality provided in the kiosk. For example, the kiosk device 100 may be originally constructed as an non-configured base which contains the functional elements common to all specific implementations of the kiosk device that do not change on a per implementation basis. Those elements that may change depending on the specific configuration may be grouped into a series of configuration kits which provide the specific complement of equipment and corresponding functionality required for a given kiosk configuration. These devices may be selectively included in a kiosk device 100 to provide a specific functionality.

Figure 2:
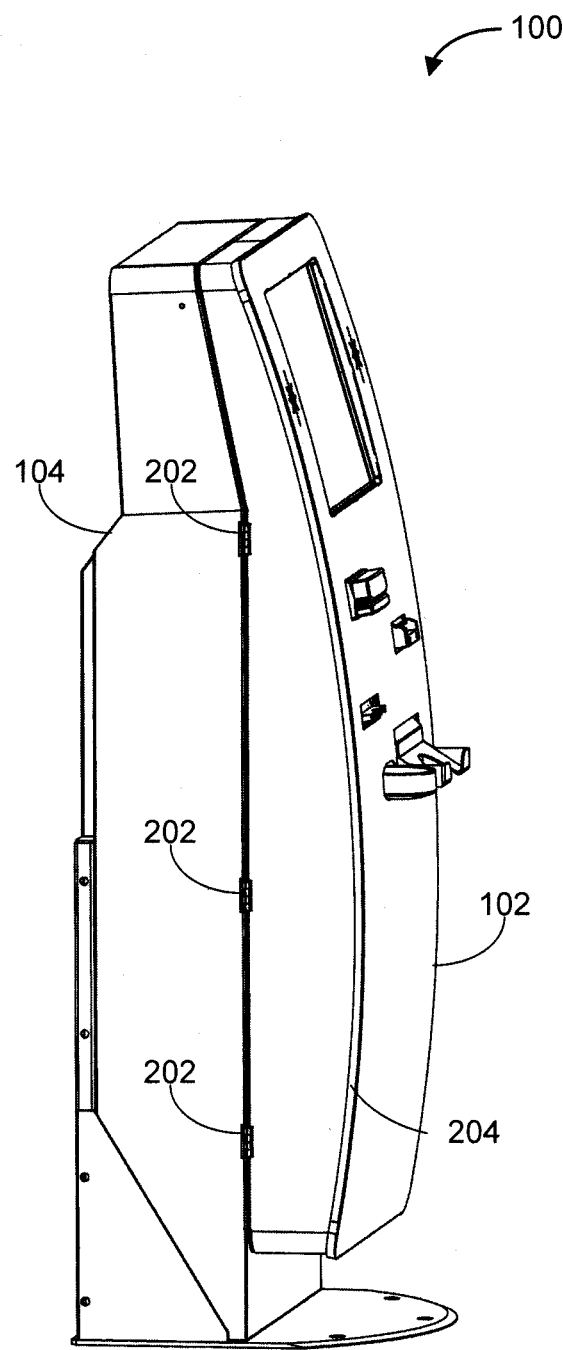
FIG. 2 is a side perspective view of the kiosk device from FIG. 1.

FIG. 2 is a left-side perspective view of the kiosk device 100 from FIG. 1. As shown from this point of view, the kiosk device 100 has a door 102 and a body 104 which are operatively coupled by hinges 202 (or some other suitable door attachment component). The kiosk door 102 may be opened by rotating the door around the hinges 202 to open the interior of the kiosk device 100. Typically, the door is secured so that only those persons with authorized access may open the door 102. Also shown on the door is a door overlay 204. The door overlay 204 is a "skin" that is placed over the outer layer of the kiosk door 102 which includes one or more cutouts which allow access to various devices (such as the bill dispenser 110 and coin cup 112, for example) which may extend beyond the interior of the kiosk device 100.

Figure 3:
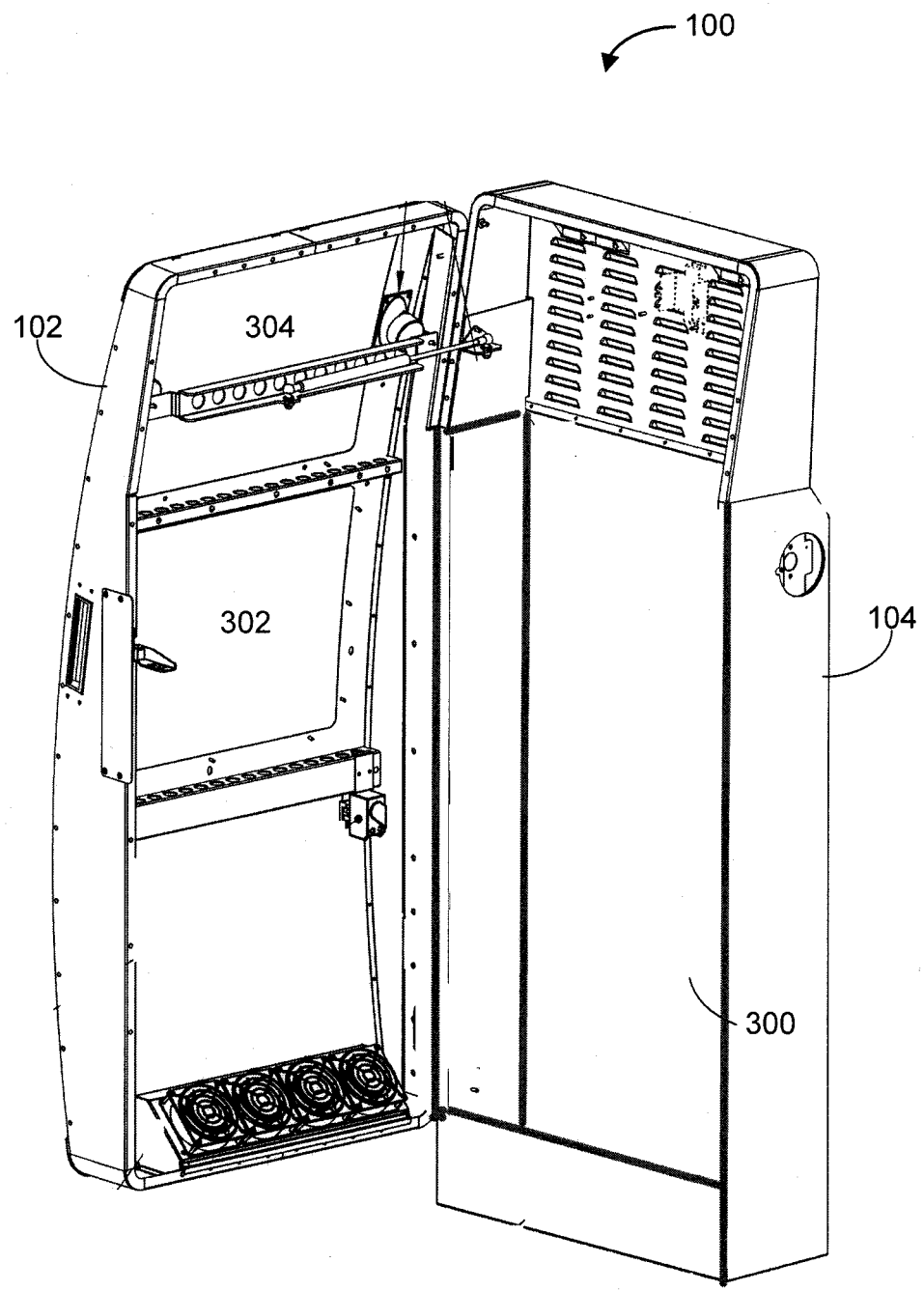
FIG. 3 is a perspective view of the cabinet housing of an unconfigured kiosk device with its door open.

Turning to FIG. 3, a right front perspective view of a non-configured kiosk device 100 (e.g. without any configuration kits installed) is shown with the door 102 ajar and extended away from the body 104. As noted above, the kiosk device 100 may be originally constructed to include only those components and devices which are common to any configuration and/or implementation of the kiosk device 100. As shown in FIG. 3, the kiosk device 100 has a kiosk door 102 opened to expose the kiosk cabinet housing 300. The kiosk housing 300 may include various mounts and other securing mechanisms (not shown) for receiving, attaching, and installing configuration kits necessary for a specific implementation.

The kiosk housing 300 in the non-configured kiosk device 100 also includes various base components that are typically included in all kiosk configurations. For example, audio output devices (not shown) may be included in the base configuration. Further, power supply components (also not shown) may also be included in a base configuration. Although these components may be included in a non-configured kiosk device 100, a skilled artisan will appreciate that these types of components and devices could also be implementation specific, and therefore could form portions of configuration kits in other implementations and/or embodiments. In the example provided in FIG. 3, the kiosk door 102 includes two apertures: a lower aperture 302 and an upper aperture 304. The lower aperture 302 typically provides access to configuration kit components that protrude through the door for user accessibility. The upper aperture 304 typically provides access to a touch screen display that may be mounted within the kiosk cabinet housing 300.

As noted previously, the cabinet housing 300 of the non-configured kiosk device 100 may be equipped with various kiosk configuration kits which provide functionality that is specific to a desired kiosk implementation. Many of the configuration kits include components that may accessed by the user in order to interact with the kiosk device 100. For example, a kiosk configuration kit may include cash accepting components which allow the user to insert cash payments into the kiosk device in order to complete a transaction. In order for the various kiosk components to be made accessible to users, the lower aperture is provided in the kiosk door 102 which provides access to the desired internal component devices. As shown in FIG. 3, the lower aperture 302 is a contiguous area which generally covers a large portion of the door. As a result, the lower aperture 302, standing alone, may provide considerably more access to the inner cabinet housing 300 than is desirable. In order to limit the access to the kiosk cabinet housing 300, a door inlay plate may be affixed or otherwise connected to the kiosk door 102 to provide cutouts which correspond to internal kiosk devices which require accessibility by the user. The cutouts may be roughly similar in size to the internal devices which protrude from the cabinet housing 300.

Figure 4:
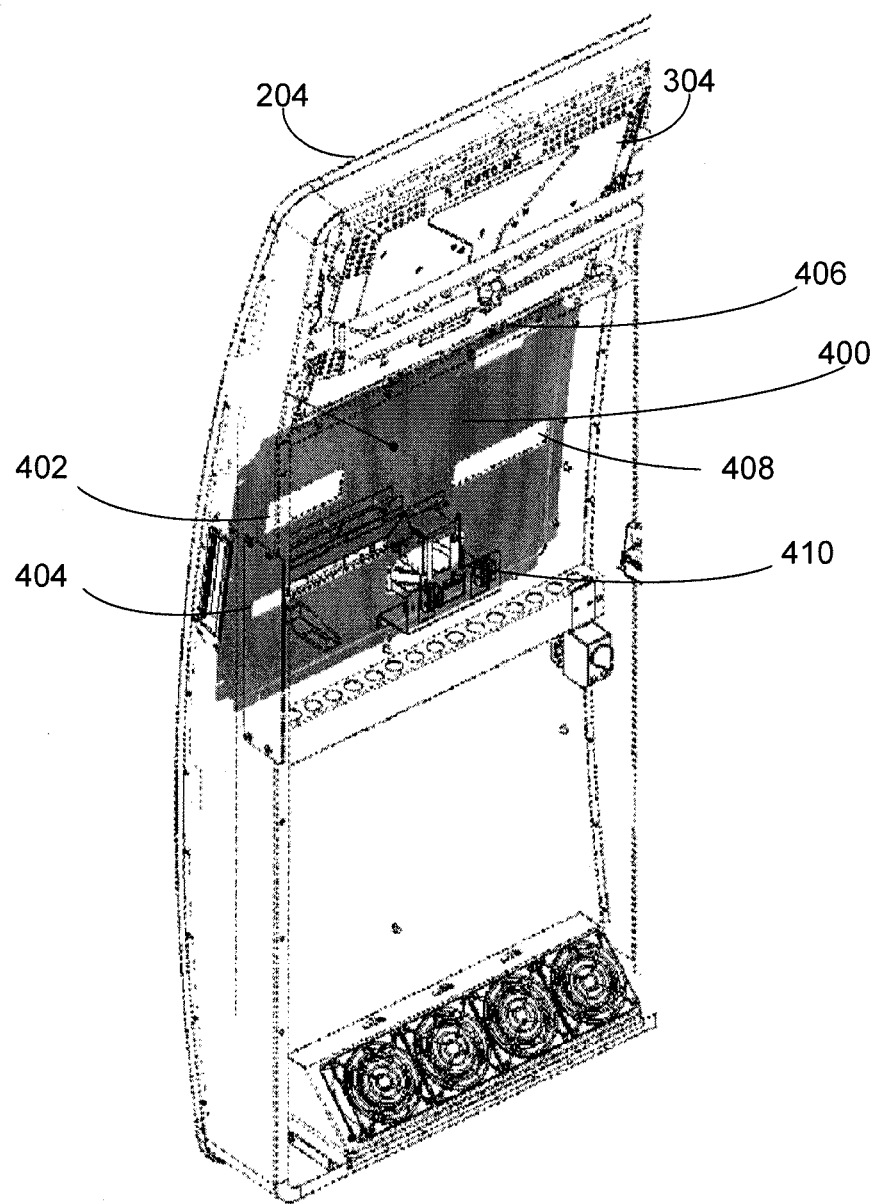
FIG. 4 is a rear perspective view of a kiosk door and a door inlay that is positioned adjacent to an interior surface of the kiosk door.

Referring now to FIG. 4, an example of the kiosk door 102 with an attached door inlay 400 is provided. As shown, the door inlay 400 may be positioned to substantially cover the lower aperture 302, with a series of cutouts which may be provided to allow certain internal devices to extend beyond the kiosk door 102 for customer access. The door inlay 400 may take the form of a sheet metal plate which may be fabricated with the cutouts in the appropriate places based on the internal configuration of the kiosk device 100. As can be appreciated, if the internal configuration of the kiosk device 100 changes so that the position of protruding kiosk components no longer corresponds to the cutouts in the inlay 400, a new inlay may be provided which provides suitable cutout locations without requiring modification or reconfiguration of the kiosk door 102 itself. The kiosk door 102 may include ridges, mounts, or some other securing means suitable for attaching the door inlay 400 to an interior surface of the kiosk door 102.

As noted above, the door inlay 400 may include one or more cutouts which generally correspond to internal kiosk components which protrude through the kiosk door 102. In the example shown in FIG. 4, various specific cutouts are present. For example, the door inlay plate 400 includes a bill acceptor cutout 402 which is shaped to allow the bill accepting device bezel 108 to extend through the cutout 402 and the lower aperture 302 of the kiosk door 102. The bill acceptor is then able to receive paper currency inserted by a user into the kiosk device as payment for a transaction.

Another cutout that may be provided in the door inlay 400 is a bill dispenser cutout 404. The bill dispenser cutout 404 may be positioned to receive the bill dispenser tray 110 which distributes paper currency from the kiosk device 100. Typically, the bill dispenser is used to provide change to a customer when the amount of money inserted into the bill acceptor exceed the transaction total. The bill dispenser may be part of a bill dispenser configuration kit, and is discussed in additional detail below in connection with FIG. 10.

The door inlay 400 may further include a cutout which corresponds to the magnetic card reader device. The magnetic card reader cutout 406 may correspond to the magnetic card reading bezel 116 which is installed in the kiosk cabinet 300 and is typically used to receive payment or other information from a credit card or other card device which includes a magnetic strip. The door inlay may also include a cutout which corresponds to the receipt printing bezel 114. The receipt printing cutout 408 may be positioned to allow the receipt printing bezel 114 (which may be associated with a thermal receipt printer, for example) to extend through the kiosk door 102 and the lower aperture 302 to allow documents printed by the receipt printer to be retrieved by the kiosk customer. In the example shown in FIG. 4, a coin cup cutout 410 is also provided. The coin cup cutout generally 410 corresponds to the coin cup 112 which delivers coins to the customer in increments that are smaller than provided by paper currency. As will be discussed in additional detail below, the coin cup 112 may be a component of a coin hopper configuration kit which provides coin storage and delivery in the kiosk device 100.

Figure 5:
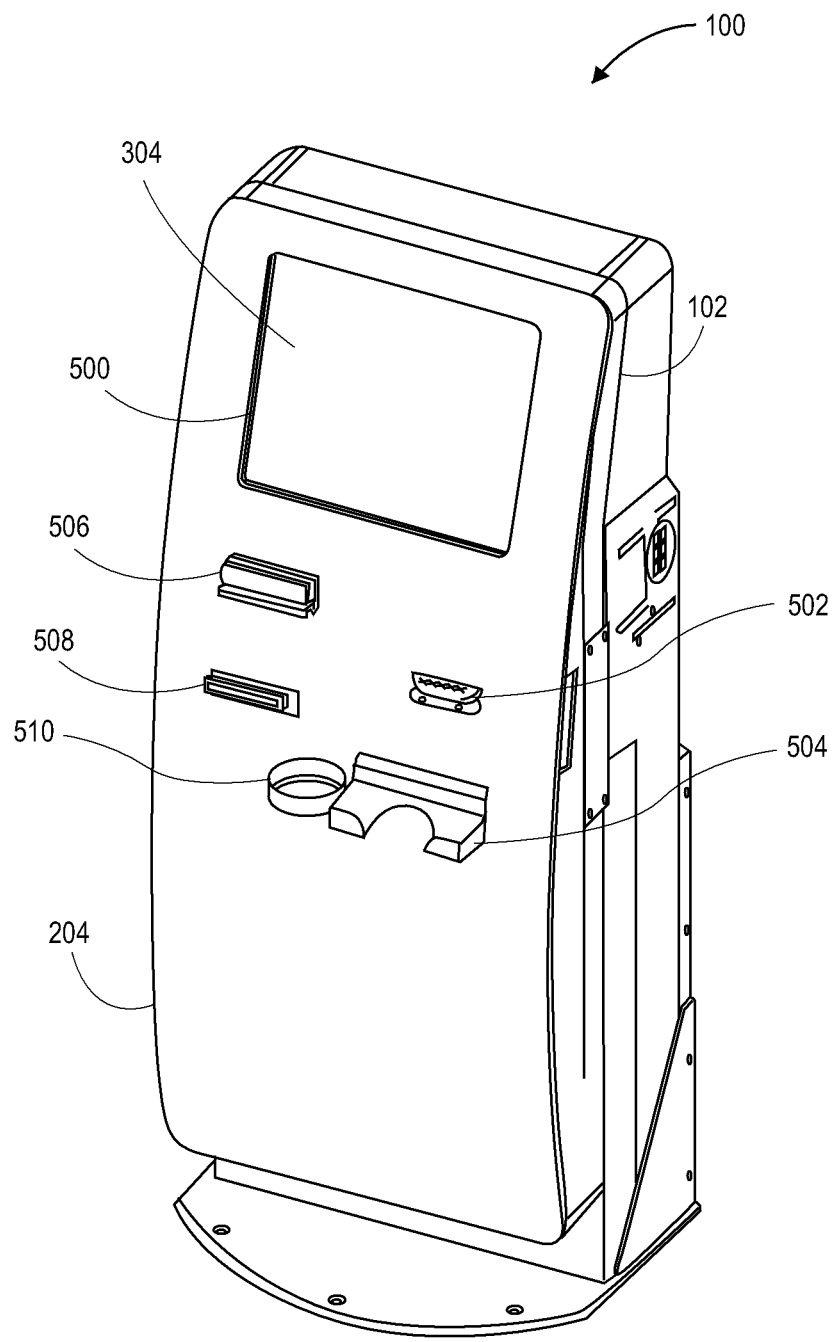
FIG. 5 is a front perspective view of one example of a door overlay positioned adjacent to an exterior surface of the kiosk door.

As noted previously, the kiosk door 102 may also include a door overlay 204. FIG. 5 provides one example of how a door overlay 204 may be used in conjunction with the door inlay 400 to allow access to kiosk device components. In this particular embodiment, the door overlay 204 includes various cutouts which correspond to the cutouts that are present in the door inlay 400. These cutouts include a bill acceptor cutout 502, a bill dispenser cutout 504, a magnetic card reader cutout 506, a receipt printer cutout 508 and a coin cup cutout 510. The door overlay 204 illustrated in FIG. 5 further includes an upper aperture cutout 500 which allows access to a touch screen display via the upper aperture 304 in the kiosk door 102.

In the embodiment shown in FIG. 5, the door overlay 204 includes cutouts which correspond to the cutouts which are provided in the door inlay 400 shown in FIG. 4. In some embodiments, instead of having cutouts which correspond to device components, the door overlay 204 may instead include a first larger cutout which corresponds to the lower aperture 302 and a second cutout which corresponds to the upper aperture 304. By providing a first larger cutout which corresponds to the lower aperture 302, the door inlay 400 may be exposed to the user through the first larger cutout in the door overlay 204. This type of configuration may be advantageous because reconfiguration of the internal kiosk components requires only that the door inlay 400 cutouts be changed, and not the cutouts in the door overlay 204.

As noted previously, the cabinet housing 300 of the kiosk device 100 may include a distinct set of assembled components (referred to herein as a configuration kit) which are configured to carry out a functional element for the kiosk device 100. Each distinct set of assembled components provides a modular approach to implementation of the functionality provided in the kiosk. FIGS. 6-10 are block diagrams which describe various configuration kits which may be installed in the kiosk device 100.

Figure 6:
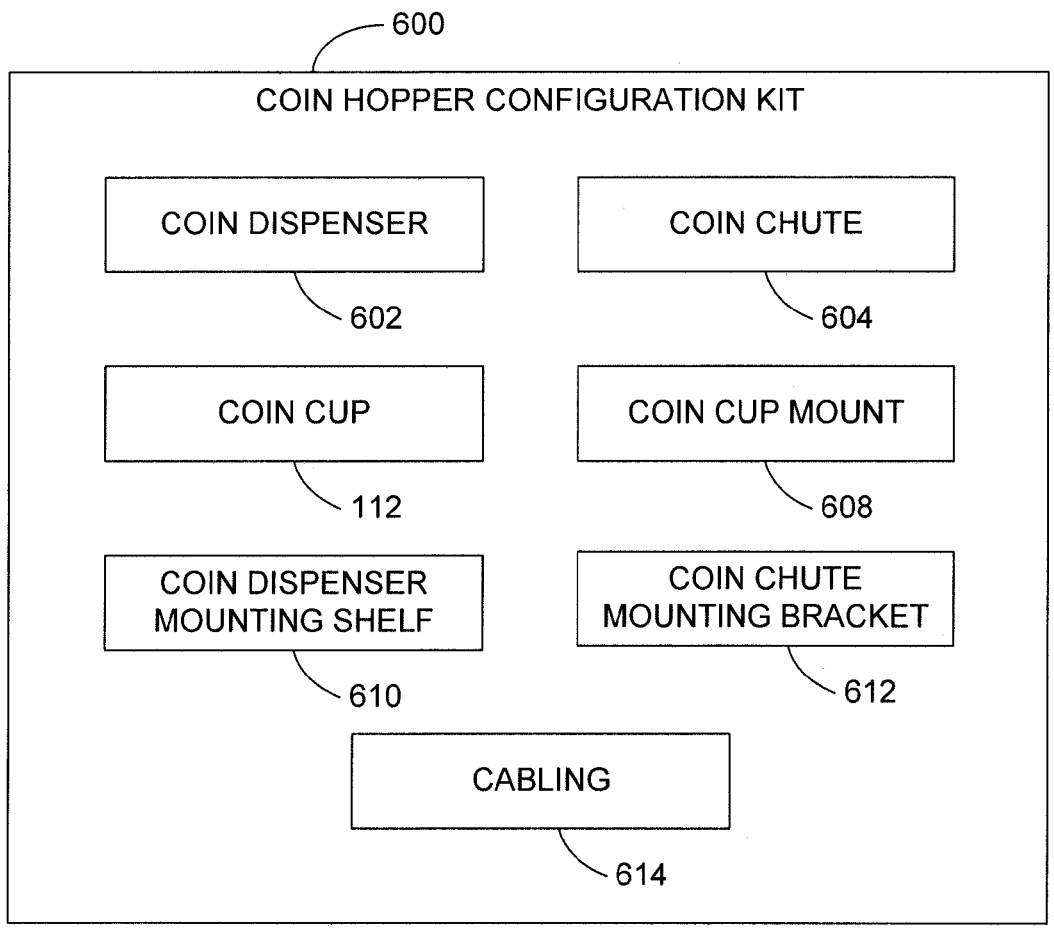
FIG. 6 is a block diagram showing various components of a coin hopper configuration kit which may be added to the unconfigured kiosk device shown in FIG. 3.

FIG. 6 is an example of a coin hopper configuration kit 600. A coin hopper configuration kit 600 includes components which provide functionality related to storing and dispensing coins from the kiosk device 100. The kit may include several components which are pre-assembled and integrated into the housing 300 of the kiosk device 100. These components may include a coin dispenser 602 which stores coins and is generally configured to release coins into a coin chute 604 which delivers dispensed coins into the coin cup 112 which protrudes through the kiosk door 102, and the corresponding cutouts in the door inlay 400 and door overlay 204. The coin dispenser may be an integrated 3 hopper coin dispenser such as the Telequip CX dispenser as is known in the art. The coin hopper configuration kit 600 may also include a coin cup mount 608 which may be affixed to the door inlay 400 in order to provide support to the coin cup 112. A coin dispenser mounting shelf may also be included in the kit 600 which supports the installation of the coin dispenser 602 within the cabinet housing 300. The coin chute 604 may also be supported by a mounting bracket 612. The kit 600 may also include cabling 614 (such as a serial cable) which allows the dispenser to communicate with software which controls the dispensation of coins.

Figure 7:
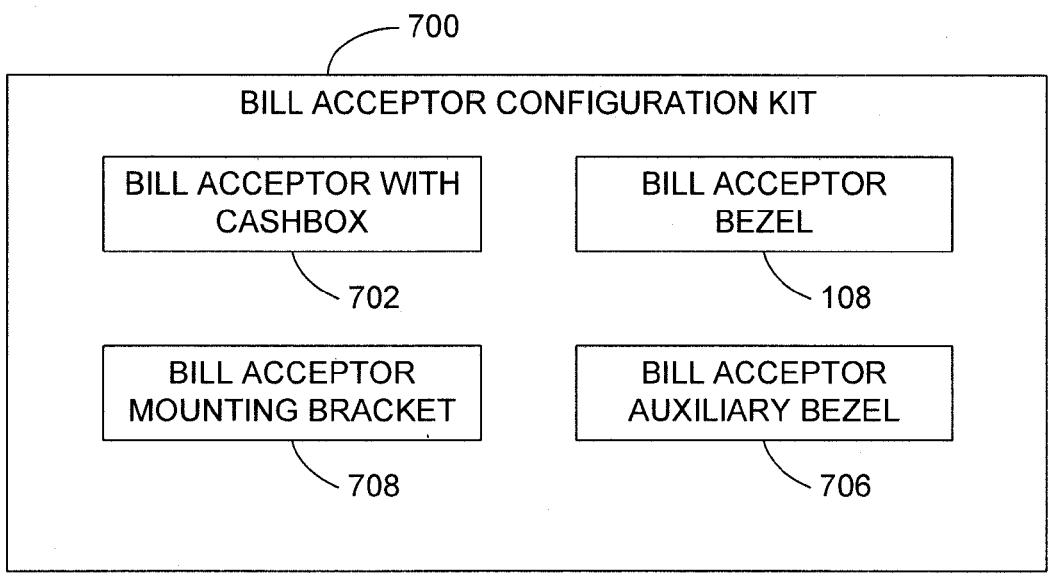
FIG. 7 is a block diagram showing various components of a bill acceptor configuration kit which may be added to the unconfigured kiosk device shown in FIG. 3.

FIG. 7 is a block diagram illustrating various components which may be included in a bill acceptor configuration kit 700. The bill acceptor configuration kit 700 generally may include components which provide the necessary functionality to perform paper cash handling operations in the kiosk device 100. As shown, the bill acceptor configuration kit 700 may include a bill acceptor bezel 108 which extends through the corresponding cutouts in the door inlay 400 and/or door overlay 204. The bill acceptor device bezel 108 typically receives dollar bills from a customer as part of a cash-based transaction and may assist the process of moving received bills from the bill acceptor device 108 into a cashbox portion 702 which stores the cash received into the kiosk device 100. The kit 700 may further include a bill acceptor auxiliary bezel 706 which typically is used to restrict access to the interior of the device by filling any open space in the corresponding cutout. In some embodiments, the bill acceptor device may be a model SC6627 device provided by MEI Group. Other cash handing devices may be used. The kit may also include a mounting bracket 708 which may be secured to a corresponding mount on the interior surface of the cabinet housing 300 of the kiosk device 100.

Figure 8:
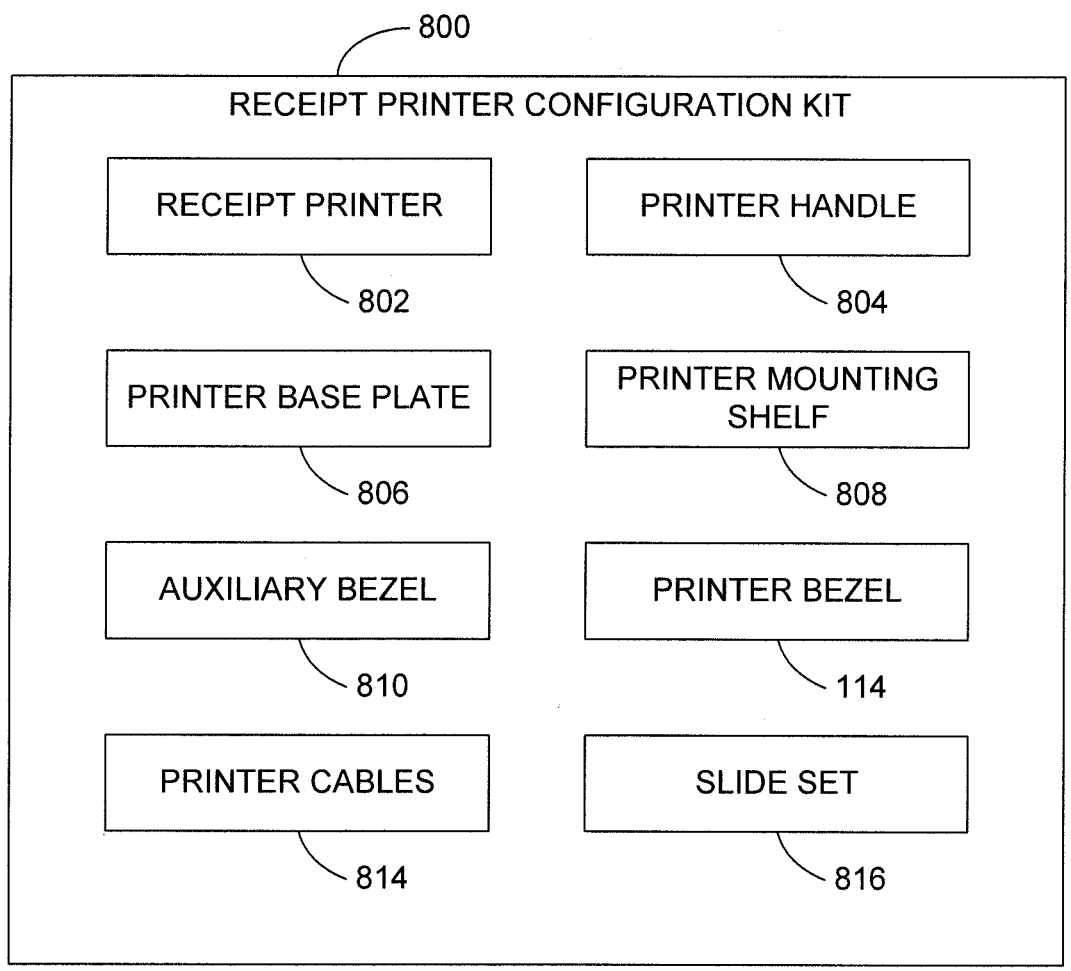
FIG. 8 is a block diagram showing various components of a receipt printer configuration kit which may be added to the unconfigured kiosk device shown in FIG. 3.
Figure 9:
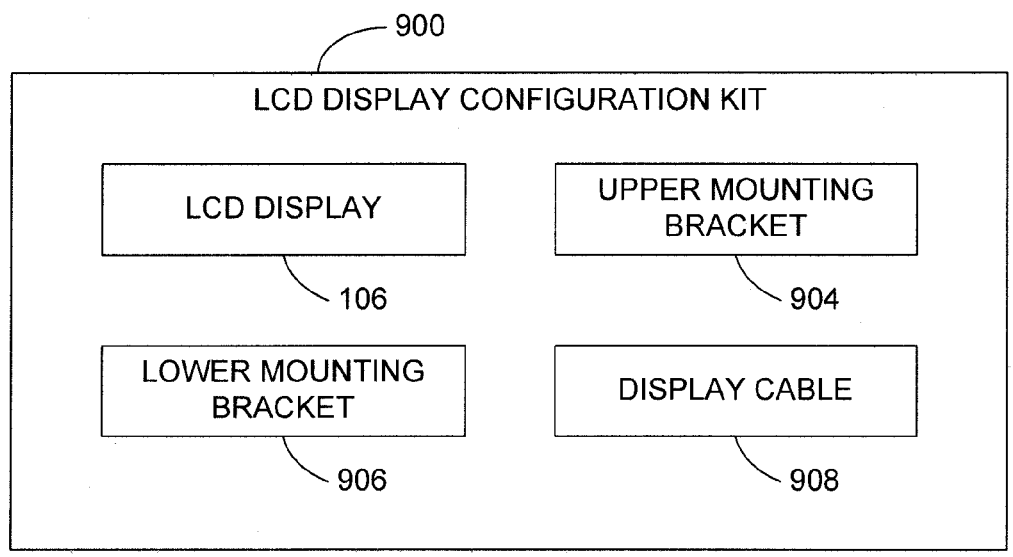
FIG. 9 is a block diagram showing various components of a display configuration kit which may be added to the unconfigured kiosk device shown in FIG. 3.

Referring now to FIG. 8, a block diagram providing an example of various components which may be included in an example of a receipt printing configuration kit 800. The receipt printing configuration kit 800 generally may include each of the components necessary to provide receipt printing services in the kiosk device 100. The kit 800 may include a receipt printer bezel 114 which may be a thermal receipt printer such as a USB based printer with an eight inch roll capacity provided by Epson Inc. The receipt printer may be positioned to extend through the corresponding cutout in the door inlay 400 and door overlay 204 to allow the customer to retrieve a receipt after making a purchase using the kiosk device 100. The kit 800 may also include a printer handle 804 which may be secured to the printer 802 and allows the printer 802 to be easily carried and maneuvered. A printer base plate 806 may also be included in the kit 800 which may be used as a platform to support the printer within the kiosk housing 300. The base plate 806 may be formed of sheet metal and placed on a mounting shelf 808 that is secured to a mounting bracket on the interior surface of the cabinet housing 300. The receipt printer configuration kit 800 may also include additional components which are used to provide receipt printing services in the kiosk device 100. These components may include an auxiliary bezel 810 which typically is used to restrict access to the interior of the device by filling any open space in the corresponding cutout. In some embodiments, the kit may include a linear slide set 816 which allows the kit to be easily extended outside of the housing (when the kiosk door 102 is ajar) to allow for maintenance and paper replacement. The kit 800 may also include a set of printer cables which are attached to a computing device within the kiosk which controls the printing of receipts.

As noted previously, the upper aperture 304 in the kiosk door 102 typically provides access to a touch screen display that allows users of the kiosk device 100 to place food and drink orders via a graphical user interface. In some embodiments, an LCD display configuration kit 900 may be provided which allows for a display to be easily integrated into the interior housing 300 of the kiosk device. The LCD display configuration kit 900 may include a touch screen LCD display 106. The kit may also include an upper mounting bracket 904 and a lower mounting bracket 906 which are secured to the display 106 and may be attached to a corresponding mount on the inner surface of kiosk door 102 within the kiosk housing 300. The kit 900 may further include a cable (such as a DVI interface cable, for example) which connects the LCD display to a video card which drives the display.

Figure 10:
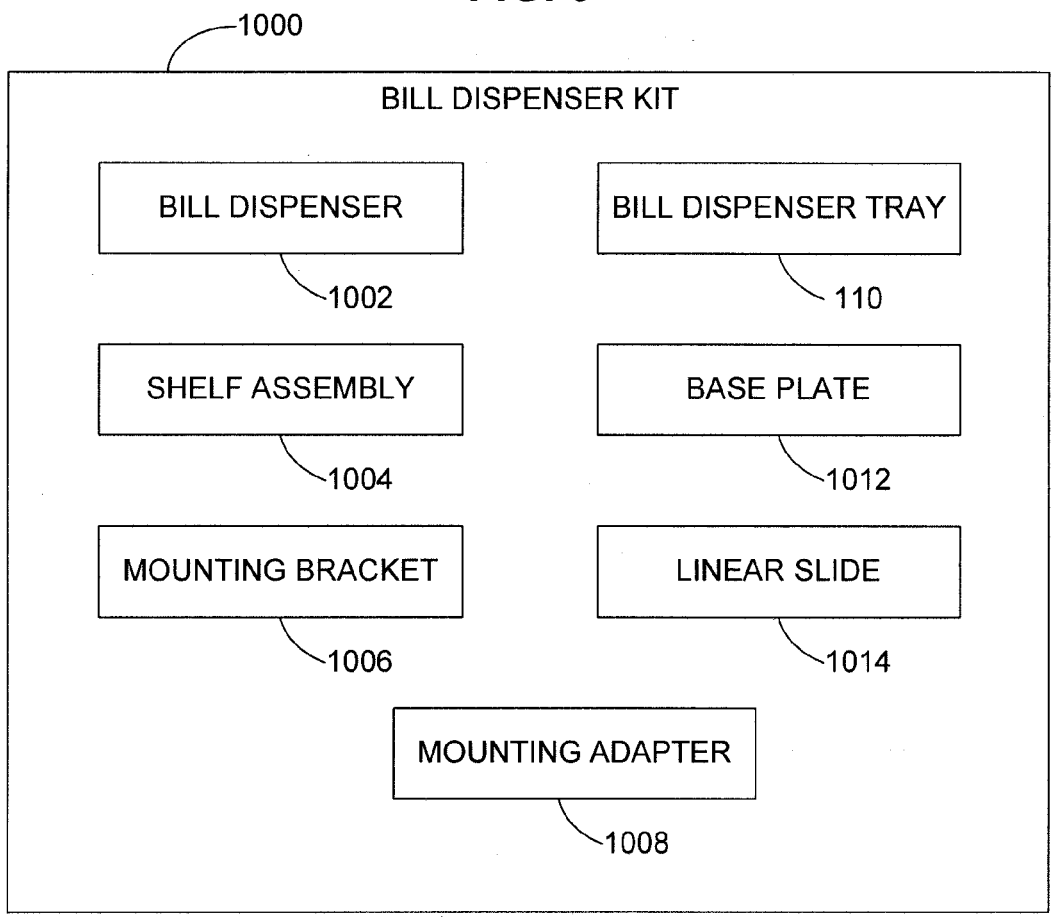
FIG. 10 is a block diagram showing various components of a bill dispenser configuration kit which may be added to the unconfigured kiosk device shown in FIG. 3.

As noted above, the kiosk device 100 may also provide a bill dispenser which delivers change to a customer via a bill dispensing device which protrudes through a corresponding cutout in the door inlay 400 and/or door overlay 204. Referring now to FIG. 10, a block diagram provides an example of a bill dispenser configuration kit 1000 which provides the components necessary for bill dispensing services. As shown the kit 1000 may include a various subcomponents which provide the equipment necessary to complete the bill dispensing task. Typically, bill dispensing takes place when a customer requires change when paying for a food or drink order that they have inputted into the device 100. The bill dispensing kit 1000 may include a bill dispenser 1002. In certain embodiments, the bill dispenser may be an LG brand ezCDM1000 bill dispenser. The bill dispenser kit 1000 may also include a shelf assembly 1004 which is installed near the base of the kiosk and may be used to support the bill dispenser device 1002. Because the bill dispenser device is typically large and heavy, additional support brackets 1006 and mounting adapters 1008 may be provided to further stabilize the bill dispenser 1002 within the housing 300 of the kiosk device 100. The bill dispensing kit also includes a bill tray 110 which protrudes through the lower aperture 302 in the kiosk door 102 and its corresponding cutout to provide customer access to bills which are dispensed. The kit 1000 may further include a base plate 1012 on which the bill dispenser 1002 may be positioned. A linear slide 1014 may also be provided which used to allow the bill dispenser 1002 to be slid away from the kiosk device for routine maintenance (such as clearing or servicing the transport mechanism) without needing to remove the dispenser 1002 from the device cabinet housing 300.

Although specific configurations for each of configuration kits described in FIGS. 6-10 are provided, it is to be appreciated that each of the configuration kits may include additional components, or alternatively entirely different components (that achieve the same functionality). Further, each of the kits may be preassembled in such a way that it may be installed as a single integrated piece within the kiosk housing 300.

In view of the above, it is to be appreciated that by providing the door inlay 400 and door overlay 204 on the kiosk door 102, and by further providing modular configuration kits such as those described in FIGS. 6-10, the kiosk device 100 is designed to facilitate the engineering and manufacturing response to evolving customer requirements that result in the need for new devices that are integral to the processing of transactions by the kiosk 100. Using the modular approach of configuration kits and providing a door inlay with cutouts which correspond to desired internal device configurations, extensive and time-consuming design changes may be avoided. Further, manufacturing processes may be reduced because a change in the internal configuration of the kiosk device 100 which results in new location of a protruding device component may be addressed merely by replacing the door inlay with a new door inlay with appropriate cutouts. Further, by providing a removable door overlay 204, a kiosk device 100 may be easily redeployed into a new customer environment by simply replacing the current door overlay 204 with a new door overlay having the appropriate customer branding.

It will be understood by those of skill in the art that numerous and various modifications can be made without departing from the spirit of the present invention. Therefore, it should be clearly understood that the forms of the invention are illustrative only and are not intended to limit the scope of the invention. While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention.

What is claimed is:

1. An ordering kiosk device, comprising:
    a cabinet housing;
    a kiosk door operatively coupled to the cabinet housing to provide access to an interior area of the housing, the kiosk door having an aperture covering a substantial portion of its face;
    a plurality of configuration kits installed within the cabinet housing, wherein the configuration kits are accessible to a user of the ordering kiosk and each configuration kit comprising one or more assembled components configured to provide functionality related to kiosk functional elements;
    a door overlay positioned on an outer surface of the kiosk door, the outer door overlay positioned to cover at least a portion of the aperture so as to block access to the interior area of the cabinet housing, the outer door overlay comprising an overlay cutout area corresponding to at least one of the assembled components of the configuration kits; and a door inlay positioned on an inner surface of the kiosk door, the door inlay comprising an inlay cutout area corresponding to at least a part of the overlay cutout area, the door inlay further comprising a mount suitable for supporting at least one of the assembled components.

2. The ordering kiosk of claim 1, wherein a computing device is installed within the cabinet housing, the computing device configured to be connected to at least one of the configuration kits.

3. The ordering kiosk of claim 1, wherein one of the configuration kits is a coin hopper configuration kit, and wherein the coin hopper configuration kit comprises a coin dispenser, a coin chute, a coin cup, and a cable connecting the coin hopper configuration kit to a computing device configured to control coin dispensation.

4. The ordering kiosk of claim 1, wherein one of the configuration kits is a bill acceptor configuration kit, and wherein the bill acceptor configuration kit comprises a bill acceptor bezel, a bill acceptor auxiliary bezel, and a cash box configured to store cash.

5. The ordering kiosk of claim 1, wherein one of the configuration kits is a receipt printing configuration kit, and wherein the receipt printing configuration kit comprises a receipt printer bezel, a receipt printer, a printer base plate, and a cable attached to a computing device configured to control receipt printing.

6. The ordering kiosk of claim 1, wherein one of the configuration kits is a LCD display configuration kit, and wherein the LCD display configuration kit comprises a display unit, a mounting bracket, and a cable connecting the display unit to a video card of a computing device.

7. The ordering kiosk of claim 1, wherein one of the configuration kits is a magnetic card reading configuration kit, and wherein the magnetic card reading configuration kit comprises a magnetic card reading bezel and a cable attached to a computing device configured to control card reading.

8. The ordering kiosk of claim 1, wherein the inlay cutout area's size is substantially similar to a device protruding from the cabinet housing.

9. The ordering kiosk of claim 1, wherein the overlay cutout area comprises a first cutout area that corresponds to a component of one of the configuration kits, and wherein the component is configured to be accessible to a user of the ordering kiosk.

10. The ordering kiosk of claim 1, wherein the overlay cutout area and the inlay cutout area are substantially similar in size and shape.

11. The ordering kiosk of claim 1, wherein the overlay cutout area comprises a first cutout area positioned to allow at least one of the assembled components to protrude through the first cutout area.

12. The ordering kiosk of claim 11, wherein the overlay cutout area comprises a second cutout area positioned to allow access to a display screen mounted in the cabinet housing.

13. A method of configuring an ordering kiosk, the ordering kiosk having a cabinet housing, a door coupled to the cabinet housing, the door having an aperture extending across a substantial portion of the door, the method comprising:

attaching a first door inlay to an interior surface of the kiosk door, wherein the door inlay is configured to provide limited access to the interior of the ordering kiosk, the door inlay comprising a first cutout corresponding to a first kiosk component protruding from the cabinet housing and through the aperture of the door; and attaching a first door overlay to an exterior surface of the door, the door overlay having a second cutout large enough to receive the first kiosk component protruding through the first cutout.

14. The method of claim 13, further comprising:

replacing the first kiosk component with a second kiosk component, the second kiosk component having a substantially different shape from the first kiosk component;

detaching the first door inlay from the interior surface; and attaching a second door inlay to the interior surface, the second door inlay having a third cutout corresponding to the second kiosk component.

15. The method of claim 13, further comprising:

detaching the first door overlay from the exterior surface; and attaching a second door overlay to the exterior surface, the second door overlay having a fourth cutout corresponding to a second kiosk component.

* * * * *